Jan. 17, 1956   O. J. POUPITCH   2,730,780
HUB CAP CLIP
Filed May 18, 1953
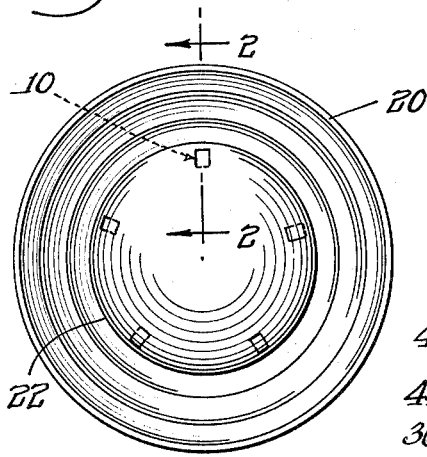
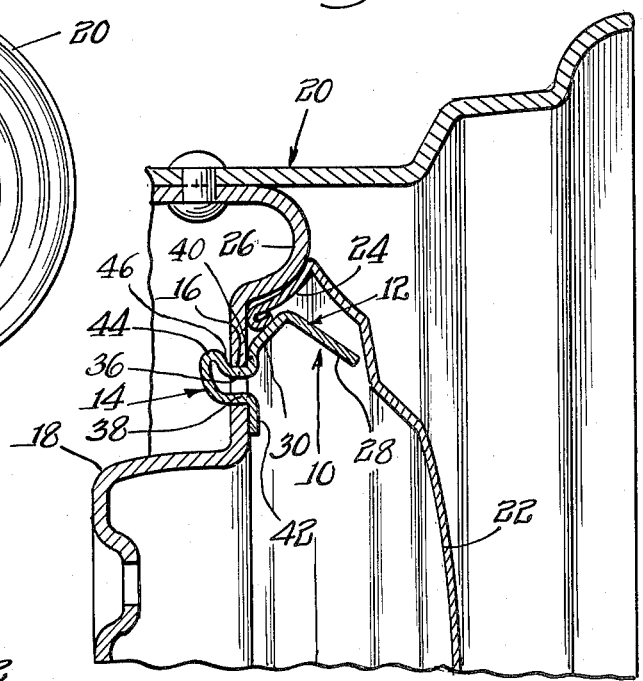
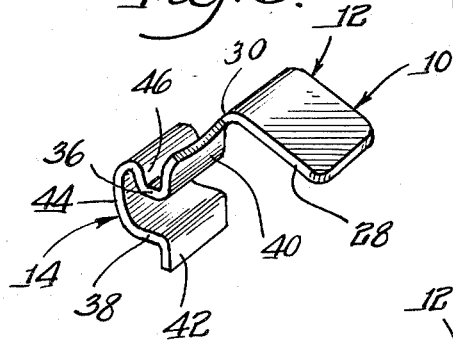
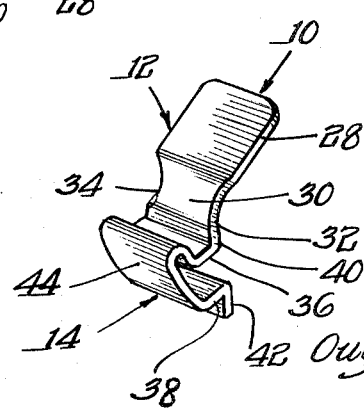
INVENTOR.
Ougljesa Jules Poupitch
BY
Olson & Trexler
Attys.

United States Patent Office 2,730,780
Patented Jan. 17, 1956

2,730,780

HUB CAP CLIP

Ougljesa Jules Poupitch, Chicago, Ill., assignor to Illinois Tool Works, Chicago, Ill., a corporation of Illinois Application May 18, 1953, Serial No. 355,566

1 Claim. (Cl. 24—73)

The present invention relates to a novel mounting clip, and more particularly to a novel clip for mounting hub caps and the like to wheels.

As is well known, there are various sizes of hub caps which may be applied to automobile wheels, which hub caps are usually secured to the wheels by means of mounting clips. In general, the practice has been to attach such hub cap mounting clips to the disk portion of the automobile wheel by means of welding or riveting. In order to effect manufacturing economies in producing automobile wheels by mass production, all of the wheels are initially provided with mounting clips disposed to receive a standard relatively small size hub cap. In the event it is ultimately determined that the buyer prefers another size of hub cap, and more particularly a relatively large hub cap, it is necessary to remove the mounting clips. Since the clips have been welded or riveted to the wheel disk, such removal is relatively difficult and time consuming and also creates danger of injuring the wheel. It is, therefore, an object of this invention to provide a novel mounting clip which may be quickly and easily snapped on to or removed from a wheel, preferably after a determination has been made as to which size hub cap is to be used on a particular wheel.

Another object of the present invention is to provide a novel mounting clip of the above described type which may be easily installed on a wheel without the need for auxiliary securing means, such as welds or rivets.

Still another object of the present invention is to provide a novel mounting clip of the above described type which may be quickly and economically manufactured from sheet stock.

Other objects and advantages of the present invention will become apparent from the following description and the accompanying drawings, wherein:

Fig. 1 is a side elevational view, showing a wheel and a hub cap mounted thereon by means of the novel mounting clips of this invention;

Fig. 2 is an enlarged fragmentary cross sectional view taken along line 2—2 in Fig. 1;

Fig. 3 is a perspective view, illustrating the novel mounting clip of this invention; and Fig. 4 is another perspective view, illustrating the novel clip of this invention.

Referring now more specifically to the drawings, wherein like parts are designated by the same numerals throughout the various figures, a mounting clip 10 embodying the principles of this invention is shown best in Figs. 2, 3, and 4. The clip 10 is made from any suitable strip of sheet material, preferably spring steel. In accordance with the present invention, the sheet material strip is reversely bent adjacent one end thereof to provide legs which cooperate to form a hub cap retaining portion 12 and a clip attachment portion 14. The attachment portion is insertable through a suitable aperture 16 provided in a wheel disk 18 of any suitable standard automobile wheel 20. A hub cap 22 of any standard design including a peripheral inturned flange 24 is assembled over the mounting clips of this invention in the usual manner and retained between the mounting clips and an annular abutment 26 formed on the disk portion of the wheel.

The hub cap retaining portion 12 includes an outer guide or cam section 28 and a hub cap engaging section 30. As shown best in Fig. 2, the section 30 extends generally outwardly from the wheel when the clip is assembled and is also inclined outwardly from the axis of the wheel, whereby to overlie on the inturned flange 24 of the hub cap. The guide or cam section 28 is inclined inwardly with respect to the axis of the wheel so that upon application of the hub cap to the clip, the section 28 guides the edge of the flange 24 to the position shown in Fig. 2. In addition, the initial application of the hub cap to the guide section 28 causes the section 30 to flex inwardly, thereby facilitating the assembly of the hub cap. In order to increase the flexibility of the section 30, the opposite edges thereof are recessed, as at 32 and 34 (see Fig. 4).

The attachment portion 14 of the clip is integral with and formed as a continuation of the inner end of the hub cap retaining portion. The attachment portion includes a pair of leg sections 36 and 38 which form a stud insertable through the aperture 16 in the wheel disk. The outer ends of the sections 36 and 38 terminate in flanges 40 and 42, respectively, for engaging the outer surface of the wheel disk on opposite sides of the aperture and the adjacent intermediate portions of the sections 36, 38 form a throat portion. Preferably, the flanges 40 and 42 extend generally perpendicularly from their respective clip sections, but this angle may vary to permit the flanges to conform generally with the surface of the wheel disk. The flange 40, of course, provides on integral connection between the hub cap retaining portion and the attachment portion of the clip. The inner ends of the sections 36 and 38 are integrally connected by a looped portion 44, which looped portion provides a resilient connection between the sections. In addition, the looped portion is offset, as illustrated, to provide an abutment surface 46 engageable with an inwardly facing surface of the wheel disk. Preferably, this abutment surface 46 is disposed at an acute angle to the section 36 to facilitate application of the clip to the wheel.

The novel clip 10 of this invention may be easily assembled with the wheel disk merely by turning the clip slightly and inserting the looped portion through the aperture 16 and then pressing the clip against the wheel. Preferably, the clip is formed so that the sections 36 and 38 are normally spaced apart a distance greater than the width of the aperture 16 so that when the clip is assembled, these sections are resiliently urged in opposite directions against the opposite sides of the aperture. In addition, it should be noted that the inclined abutment surface 46 is formed so that the junction thereof with the section 36 is spaced from the flange 40 a distance substantially equal or even slightly less than the thickness of the wheel disk. Thus, when the clip is applied to the wheel and the sections 36 and 38 are resiliently urged apart, the edge of the wheel disk will be tightly jammed between the abutment surface 46 and the flange 40. With this structure, it is seen that the novel clip 10 will be tightly and securely held in assembled relationship with the wheel disk.

From the above description, it is seen that the present invention has provided a simple and economic mounting clip which may be easily assembled to or removed from a wheel. Moreover, it is seen that the novel clip of this invention is adapted readily to receive a standard hub cap and securely retain the hub cap in position. It is, of course, understood that a plurality of the novel clips of this invention will be used for a single wheel, and in the embodiment illustrated in Fig. 1, five of the clips are spaced evenly around the wheel in the usual manner.

While the preferred embodiment of the present invention has been shown and described herein, it is obvious that many details may be changed without departing from the spirit and scope of the appended claim.

The invention is claimed as follows:

A one piece resilient sheet material clip adapted to be detachably secured to an apertured wheel for mounting a hub cap or the like on the wheel, and comprising an elongated strip of sheet material reversely bent adjacent one end thereof to provide spaced legs forming a throat portion and a stud portion angularly offset from the throat portion and having a closed end, said stud portion adapted for insertion through a wheel aperture with one leg providing an abutment engageable with the inner wheel surface and with the opposed legs of the throat portion resiliently urged to engage the adjacent edges of the wheel aperture, the said one leg having a flange portion continuing from said throat portion and substantially normal thereto for engagement with the outer wheel surface adjacent the aperture therethrough and in opposition to said abutment, the said one leg being substantially elongated relative to the clip and providing a hub cap retaining portion extending angularly outwardly from the outer end of said flange portion and terminating in an inclined camming portion facilitating application of a hub cap thereto, and the other leg projecting from the throat portion oppositely with respect to said flange portion and providing a relatively short flange engageable with the outer wheel surface adjacent the aperture remote from said abutment and said flange portion.

References Cited in the file of this patent

UNITED STATES PATENTS

| | | |
|---|---|---|
| 2,257,855 | Place | Oct. 7, 1941 |
| 2,428,338 | Poupitch | Sept. 30, 1947 |
| 2,526,026 | Horn | Oct. 17, 1950 |
| 2,634,472 | Brown | Apr. 14, 1953 |

FOREIGN PATENTS

| | | |
|---|---|---|
| 932,855 | France | Dec. 1, 1947 |